(12) United States Patent
Yabe

(10) Patent No.: US 11,836,409 B2
(45) Date of Patent: Dec. 5, 2023

(54) PRINTING SYSTEM, PRINTING APPARATUS, SERVER, CONTROL METHOD, AND NON-TRANSITORY COMPUTER-READABLE STORAGE MEDIUM FOR DETERMINING IF A PRINT JOB MUST BE SUBMITTED THROUGH THE SERVER

(71) Applicant: CANON KABUSHIKI KAISHA, Tokyo (JP)

(72) Inventor: Kenta Yabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/299,561

(22) Filed: Apr. 12, 2023

(65) Prior Publication Data
US 2023/0350619 A1 Nov. 2, 2023

(30) Foreign Application Priority Data
Apr. 27, 2022 (JP) .................................. 2022-072954

(51) Int. Cl.
*G06F 3/12* (2006.01)
(52) U.S. Cl.
CPC ............ *G06F 3/1288* (2013.01); *G06F 3/121* (2013.01); *G06F 3/1205* (2013.01); *G06F 3/1267* (2013.01)

(58) Field of Classification Search
CPC ............................................. G06F 3/12–1298
See application file for complete search history.

(56) References Cited

U.S. PATENT DOCUMENTS 9,047,033 B2 * 6/2015 Hibino ............... H04N 1/00344

FOREIGN PATENT DOCUMENTS

JP 2018126892 A 8/2018

* cited by examiner

*Primary Examiner* — Barbara D Reinier
(74) *Attorney, Agent, or Firm* — Canon U.S.A., Inc. IP Division

(57) ABSTRACT

In a printing system including a printing apparatus and a server that manages information about the printing apparatus, the printing apparatus transmits, to the server, monitoring information indicating a usage state of the printing apparatus. In a case where the server determines that the usage state of the printing apparatus satisfies a predetermined condition based on the monitoring information received from the printing apparatus, the server delivers, to the printing apparatus, a device setting to prohibit reception of a print job without going through the server. In a case where the printing apparatus receives the delivered device setting, the printing apparatus prohibits the reception of the print job without going through the server.

13 Claims, 11 Drawing Sheets

HARDWARE CONFIGURATION OF PC AND SERVER

HARDWARE CONFIGURATION OF IMAGE FORMING APPARATUS

PRINTING SYSTEM, PRINTING APPARATUS, SERVER, CONTROL METHOD, AND NON-TRANSITORY COMPUTER-READABLE STORAGE MEDIUM FOR DETERMINING IF A PRINT JOB MUST BE SUBMITTED THROUGH THE SERVER

BACKGROUND

Field

The present disclosure relates to a printing system, a printing apparatus, a server, a control method, and a non-transitory computer-readable storage medium.

Description of the Related Art

In recent years, a system called "Internet of Things" (hereinafter referred to as IoT) has been under active development. The IoT collects usage state data on a client terminal by considering a home electric appliance, an automobile, or the like connected to the Internet as the client terminal, and utilizes the usage state data for operation of the Internet service.

A multifunctional peripheral (hereinafter referred to as an MFP), which is an image forming apparatus having multiple functions, also functions as the client terminal connected to the IoT. The MFP includes a plurality of parts, and the IoT system collects and analyzes a huge amount of data generated from sensors attached to the parts.

This enables provision of services that have not existed before and additional values to a user of the MFP.

Japanese Patent Application Laid-Open No. 2018-126892 discusses a system in which MFPs that can be used by a user are collectively managed by a server, and data to be printed is transmitted to the MFPs through the server.

SUMMARY

According to an aspect of the present disclosure, a printing system includes a printing apparatus, and a server configured to manage information about the printing apparatus. The printing apparatus transmits, to the server, monitoring information indicating a usage state of the printing apparatus. The server receives the monitoring information from the printing apparatus. In a case where the server determines that the usage state of the printing apparatus satisfies a predetermined condition based on the received monitoring information, the server delivers, to the printing apparatus, a device setting to prohibit reception of a print job without going through the server. In a case where the printing apparatus receives the delivered device setting, the printing apparatus prohibits the reception of the print job without going through the server.

Further features of the present disclosure will become apparent from the following description of exemplary embodiments with reference to the attached drawings.

DESCRIPTION OF THE EMBODIMENTS

In a case where a user works from home and uses a printing apparatus such as a multifunctional peripheral (MFP) owned by the user, it is desirable to permit both of business use and private use of the printing apparatus. It is also desirable that print data for private use be directly printed without going through a server of the company of the user.

Meanwhile, if consumables of the printing apparatus are consumed by printing for private use, the consumables of the printing apparatus may be insufficient when printing for business use is performed. In the following exemplary embodiments, methods will be described in which the private use of the printing apparatus is controlled so that print processing for business use is not inhibited in a case where the business use and private use of the printing apparatus are both permitted.

Figure 1:
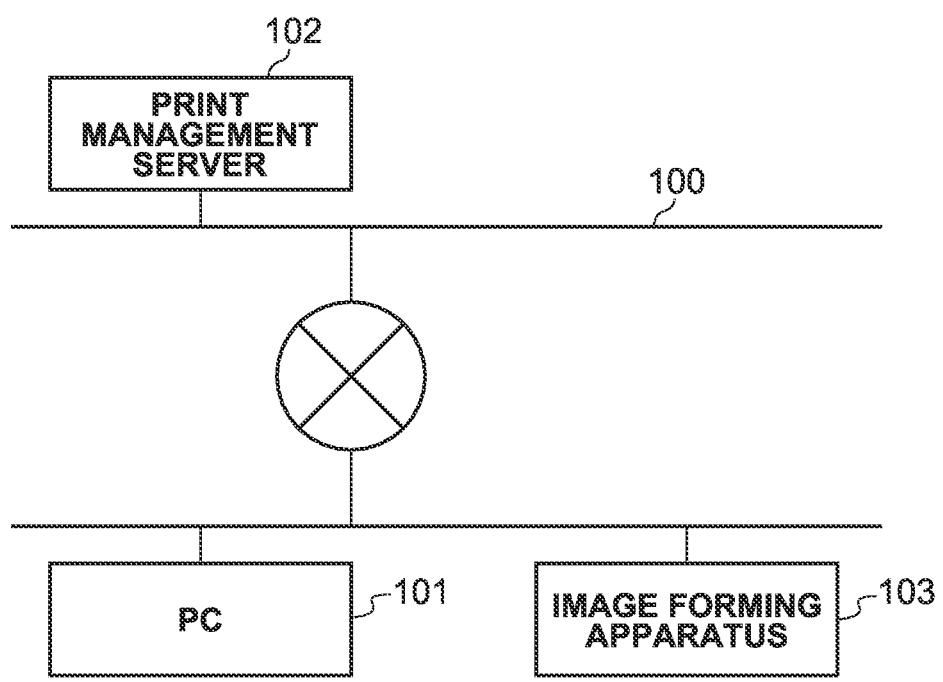
FIG. 1 is a diagram illustrating an entire configuration of a system.

FIG. 1 is a diagram illustrating an entire configuration of a printing system according to a first exemplary embodiment.

A network 100 communicably connects components of the system. The network 100 is a communication network such as the Internet, a local area network (LAN), a wide area network (WAN), a telephone line, a dedicated digital line, an asynchronous transfer mode (ATM) line, a frame relay line, a cable television line, or a data broadcasting wireless line. The network 100 can be any type of communication network that enables data transmission and reception between the components. In the present exemplary embodiment, it is assumed that the network 100 between a personal computer (PC) 101 and an image forming apparatus 103 is a LAN, and the network 100 between a print management server 102 and each of the PC 101 and the image forming apparatus 103 is the Internet.

The PC 101 is a client terminal having a function of issuing an instruction related to data to be printed by the image forming apparatus 103, to the print management server 102 or the image forming apparatus 103. In the present exemplary embodiment, the PC 101 is assumed to be a general personal computer on which a web browser and a printer driver are installed.

The print management server 102 receives a print request from the PC 101, performs conversion processing on print data, and transmits the print data to the image forming apparatus 103. The print management server 102 has a function of managing a user who has transmitted the print request, a function of managing device information received from the image forming apparatus 103, and a function of delivering a device setting to the image forming apparatus 103.

The image forming apparatus 103 is a client terminal having a function of connecting to the network 100. While in the present exemplary embodiment, the image forming apparatus 103 is assumed to be an MFP, the image forming apparatus 103 can be any type as long as it connects to the network 100 and has a function of printing print data.

In the present exemplary embodiment, for simplification of description, each of the components is provided singularly in FIG. 1. However, this does not intend to limit the numbers of the respective components in the configuration. Each of the components can be provided in plural.

Figure 2A:
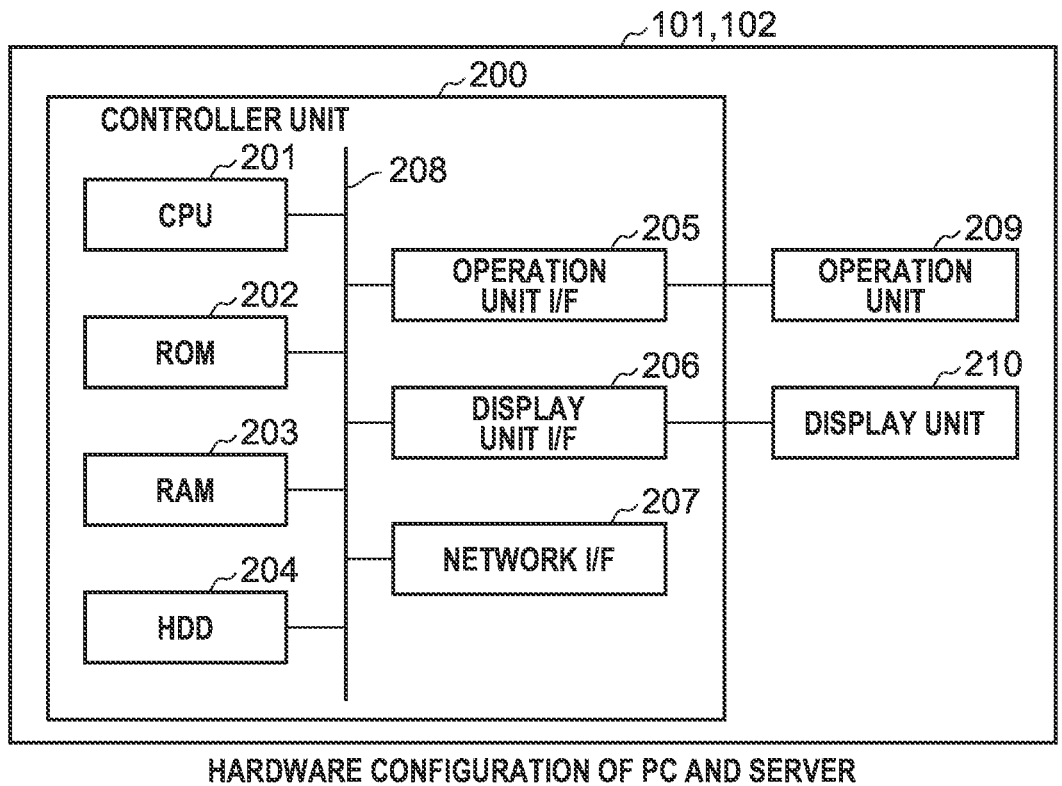
FIGS. 2A and 2B are hardware configuration diagrams.

FIG. 2A is a block diagram illustrating a general hardware configuration of an information processing apparatus serving as each of the PC 101 and the print management server 102 according to the present exemplary embodiment. Components of the information processing apparatus can be implemented as physical hardware and also implemented as virtual hardware having similar features by a virtualization technique. The information processing apparatus roughly includes a controller unit 200, an operation unit 209, and a display unit 210.

The controller unit 200 includes a central processing unit (CPU) 201.

The CPU 201 starts up an operating system (OS) using a boot program stored in a read only memory (ROM) 202.

Figure 3:
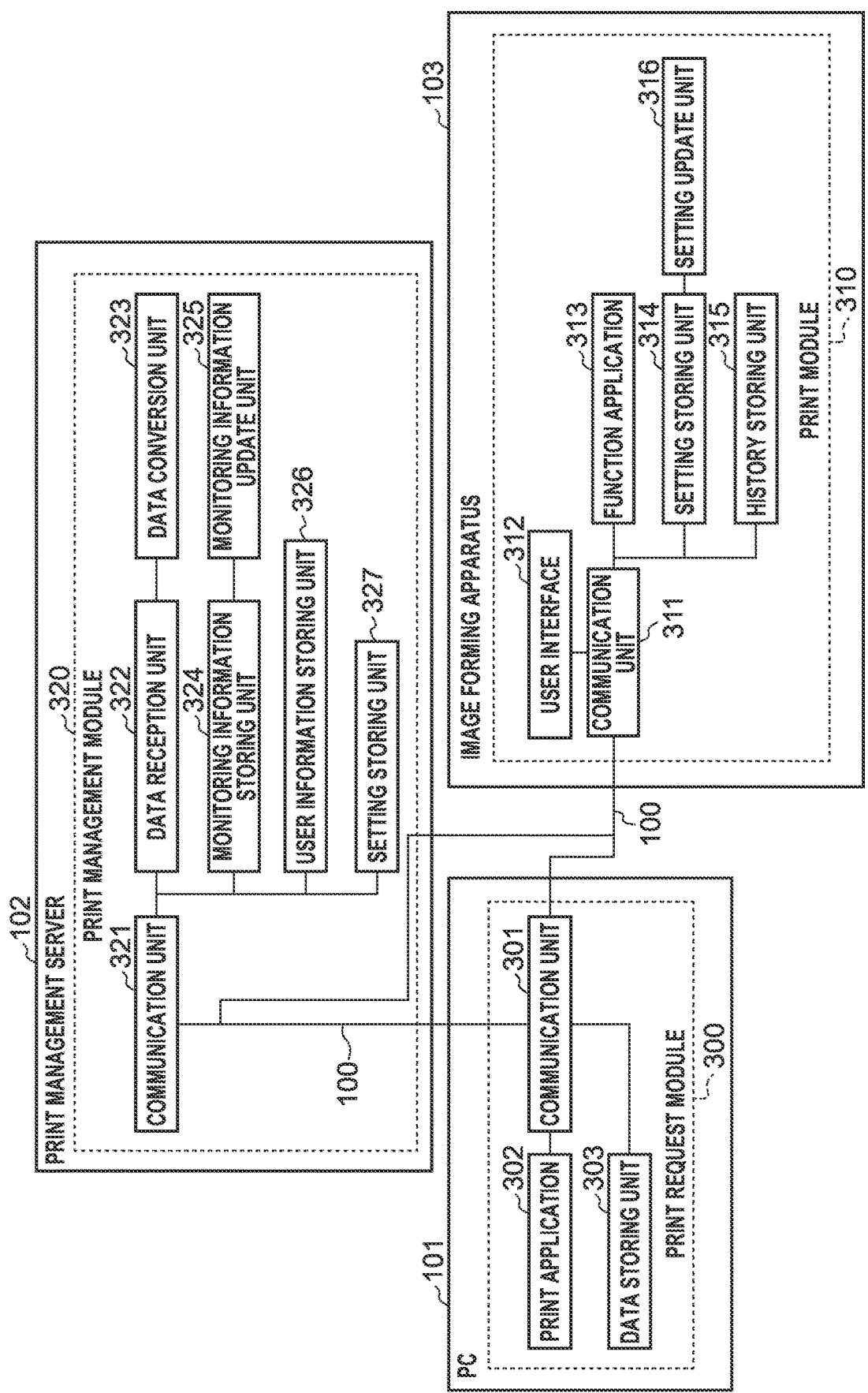
FIG. 3 is a software configuration diagram.

The CPU 201 also performs various kinds of processing by executing, on the OS, application programs stored in a hard disk drive (HDD) 204. In the present exemplary embodiment, application programs described with reference to FIG. 3 are also stored in the HDD 204.

A random access memory (RAM) 203 is used as a work area of the CPU 201.

The HDD 204 stores the above-described application programs, setting information about the information processing apparatus, and various kinds of data such as history information.

In addition to the ROM 202, the RAM 203, and the HDD 204, an operation unit interface (I/F) 205, a display unit I/F 206, and a network I/F 207 are connected to the CPU 201 through a system bus 208.

The operation unit I/F 205 is an interface with the operation unit 209 including a mouse and a keyboard, and transmits, to the CPU 201, information input by the user through the operation unit 209.

The display unit I/F 206 outputs, to the display unit 210, image data to be displayed on the display unit 210 including a display.

The network I/F 207 is connected to the network 100, and inputs and outputs information to and from apparatuses on the network 100 through the network 100.

Figure 2B:
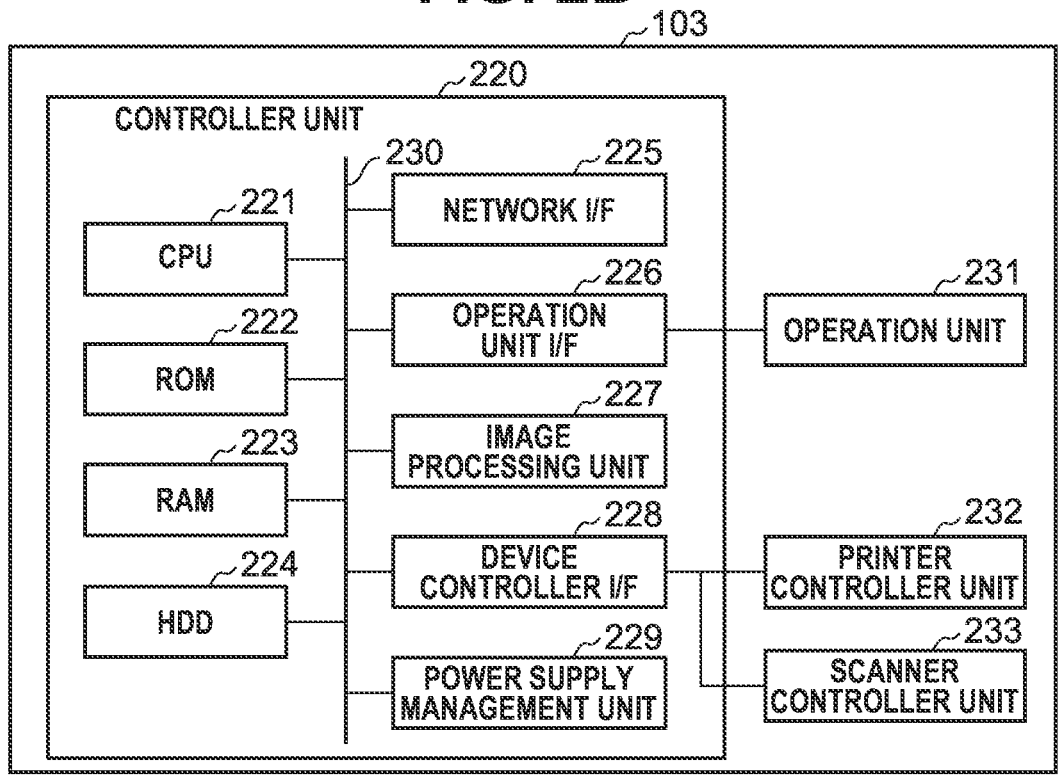

FIG. 2B is a block diagram illustrating a general hardware configuration of an information processing apparatus serving as the image forming apparatus 103 according to the present exemplary embodiment.

A controller unit 220 includes a CPU 221.

The CPU 221 starts up an OS using a boot program stored in a ROM 222.

The CPU 221 also performs various kinds of processing by executing, on the OS, application programs stored in an HDD 224.

A RAM 223 is used as a work area of the CPU 221.

The HDD 224 stores the above-described application programs, setting information about the information processing apparatus, and various kinds of data such as history information.

In addition to the ROM 222, the RAM 223, and the HDD 224, an operation unit I/F 226, an image processing unit 227, a device controller I/F 228, a power supply management unit 229, and a network I/F 225 are connected to the CPU 221 through a system bus 230.

The operation unit I/F 226 is an interface with an operation unit 231 including a touch panel, and outputs image data to be displayed on the operation unit 231. The operation unit I/F 226 also transmits, to the CPU 221, information input by the user through the operation unit 231. A scanner controller unit 233 and a printer controller unit 232 are connected to the device controller I/F 228, and the device controller I/F 228 performs synchronous/asynchronous conversion of image data.

The network I/F 225 is connected to the network 100, and inputs and outputs information to and from apparatuses on the network 100. The image processing unit 227 performs processing on an image to be output to a printer and processing on an image input from a scanner. Examples of the processing by the image processing unit 227 include image rotation, image compression, resolution conversion, color space conversion, and gradation conversion. The power supply management unit 229 performs power supply control of the entire apparatus. For example, the power supply management unit 229 performs power on/off control, controls a transition from a normal energization state to a power saving state, and controls a return to a normal state.

FIG. 3 is a block diagram illustrating software configurations of the components of the system according to the present exemplary embodiment. The application programs illustrated in FIG. 3 are stored in any of the RAM, the ROM, and the HDD of the corresponding component illustrated in FIG. 2A or 2B, and executed by the CPU of the component.

The block diagram illustrated in FIG. 3 illustrates only software elements relating to the present exemplary embodiment. For example, the image forming apparatus 103 actually includes software elements for implementing a scan function and a print function, but such elements are omitted.

A print request module 300 is a software module having a function of performing a series of print processing from the PC 101.

A communication unit 301 transmits a print processing request to the print management server 102 through the network 100. The communication unit 301 also transmits a print processing request to the image forming apparatus 103 through the network 100.

A print application 302 acquires, from a data storing unit 303, data to be printed and generates a print processing request.

The data storing unit 303 manages, in the HDD 204, the data to be printed.

A print module 310 has a function of performing a series of print processing in the image forming apparatus 103, and a function of performing processing for reflecting setting information received from the print management server 102.

A communication unit 311 receives the print processing request from the PC 101 or the print management server 102 through the network 100. The communication unit 311 also receives the setting information from the print management server 102 and transmits monitoring information to the print management server 102, through the network 100. The monitoring information is information indicating a usage state of the image forming apparatus 103. More specifically, the monitoring information includes information about remaining amounts of consumables.

A user interface 312 displays a current state of the image forming apparatus 103 on the operation unit 231, and also displays buttons and the like for receiving an operation from the user.

A plurality of function applications 313 for copying, printing, mail transmission, and the like is provided in devices of the image forming apparatus 103. The function applications 313 operate the corresponding functions in the image forming apparatus 103, triggered by a user operation through the operation unit 231, data reception through the network 100, or the like. For example, when the print processing request is received from the print management server 102, the function application 313 for printing operates.

A setting storing unit 314 manages setting information about the devices and functions of the image forming apparatus 103.

A history storing unit 315 manages information about the consumables consumed when the image forming apparatus 103 performs print processing. Examples of the consumables are toner and ink.

Details of the information managed by the setting storing unit 314 and the history storing unit 315 will be described below.

A setting update unit 316 updates the setting information managed by the setting storing unit 314, based on the setting information received from the print management server 102.

A print management module 320 has a function of determining whether to transmit, to the image forming apparatus 103, the print processing request received by the print management server 102 from the PC 101. The print management module 320 also has a function of transmitting the setting information to the image forming apparatus 103 based on the monitoring information received from the image forming apparatus 103.

A communication unit 321 receives the print processing request from the PC 101 and transmits the print processing request to the image forming apparatus 103, through the network 100. The communication unit 321 also receives the monitoring information from the image forming apparatus 103 and transmits the setting information to the image forming apparatus 103, through the network 100.

A data reception unit 322 acquires print data and print setting information included in the print processing request received from the PC 101.

A data conversion unit 323 converts the print data acquired by the data reception unit 322, into data in a format printable by the image forming apparatus 103.

A monitoring information storing unit 324 stores and manages the monitoring information received from the image forming apparatus 103, in association with user information managed by a user information storing unit 326.

A monitoring information update unit 325 updates the monitoring information managed by the monitoring information storing unit 324 every time the monitoring information is received from the image forming apparatus 103.

The user information storing unit 326 stores and manages information about a user who uses the print management server 102. The user who uses the print management server 102 is basically assumed to be an owner of the PC 101 and the image forming apparatus 103, but is not specifically limited. A user whose information is managed by the user information storing unit 326 can use the print management server 102 even though the user is different from the owner of the PC 101 and the image forming apparatus 103.

A setting storing unit 327 manages the setting information about the image forming apparatus 103 that is connected to the print management server 102 through the network 100.

Figure 4:
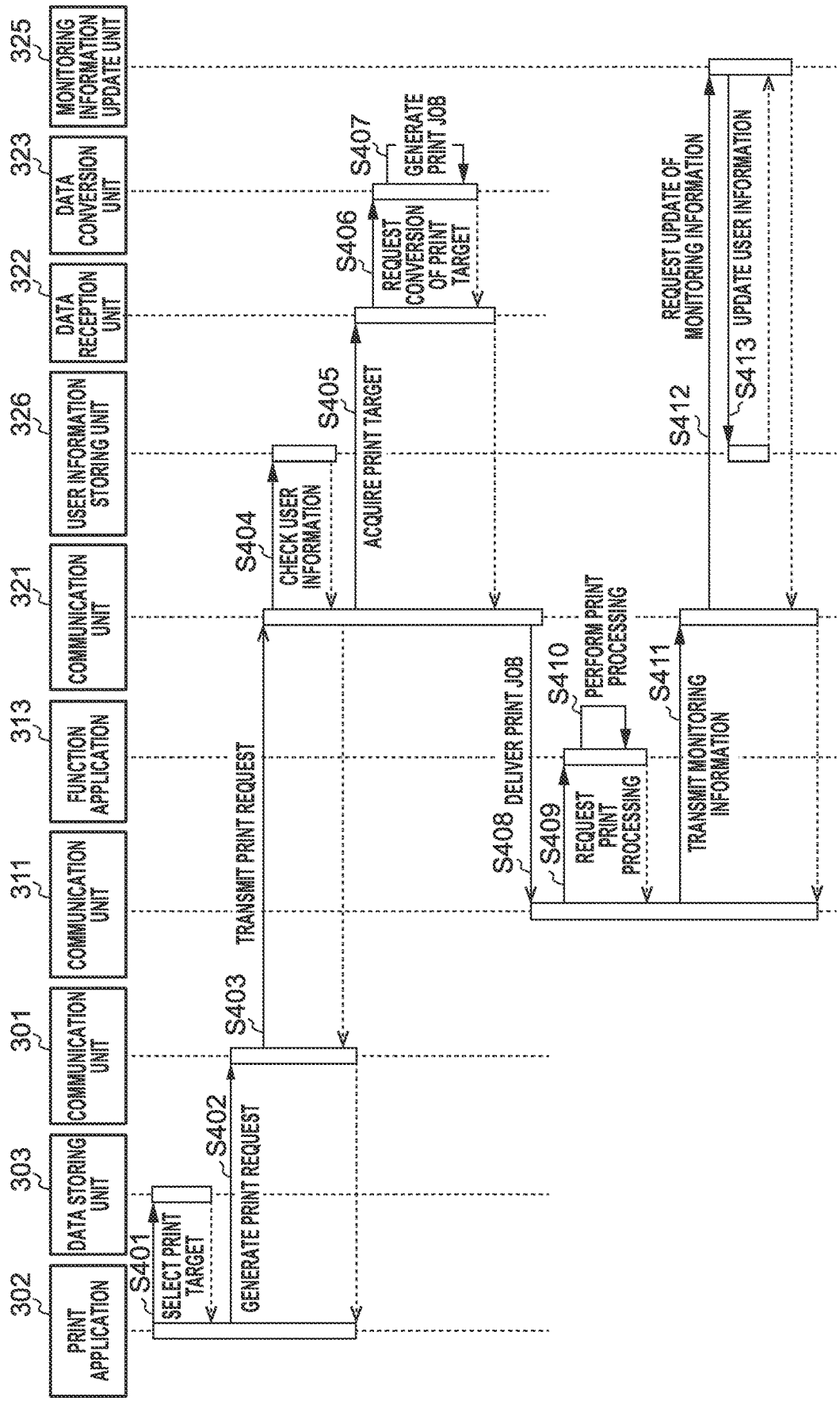
FIG. 4 is a sequence diagram illustrating business print processing through a print management server.

FIG. 4 is a sequence diagram illustrating a flow of a series of processing in a case where the PC 101 instructs the image forming apparatus 103 to perform printing through the print management server 102 in the present exemplary embodiment. FIG. 4 illustrates an example in which a business print job is executed.

In step S401, the print application 302 acquires, from the data storing unit 303, the data to be printed. For the data to be printed, various formats including a document format and an image format are available, and the format of the data is not specifically limited in the present exemplary embodiment.

In step S402, the print application 302 generates a print request based on the data to be printed and print settings.

Table 1 illustrates an example of data of the print request generated by the print application 302.

TABLE 1

| \<Print Request Data\> | | | | | |
|---|---|---|---|---|---|
| Print Data | User Identifier | Number of Pages | Print Settings: Copies | Print Settings: Color | Print Settings: Print Side |
| (Binary data) | User1 | 10 | 1 | Monochrome | One side |

A "Print Data" column stores the data to be printed. The data to be printed is basically stored in a binary data format.

A "User Identifier" column stores information for unique identification of the user who operates the print application 302 to transmit the print request to the print management server 102.

A "Number of Pages" column stores the number of pages of the data to be printed.

A "Print Settings: Copies" column stores the number of copies of the data to be printed.

A "Print Settings: Color" column stores color setting of the data to be printed.

A "Print Settings: Print Side" column stores information indicating whether the data to be printed is output to both sides or one side of a sheet.

Contents of the "User Identifier" column and the "Print Settings" columns illustrated in Table 1 are not limited to those described in the present exemplary embodiment. The contents vary depending on the configuration of the print management server 102 and the specifications of the image forming apparatus 103.

In step S403, the communication unit 301 transmits the print request data to the communication unit 321.

In step S404, the communication unit 321 determines whether a value stored in the "User Identifier" column of the print request data has been stored in the user information storing unit 326.

Table 2 illustrates an example of user information data managed by the user information storing unit 326.

TABLE 2

<User Information Data>

| ID | Service Plan | Service Start Date | Number of Printable Sheets | Upper Limit of Number of Printable Sheets | Device ID |
|---|---|---|---|---|---|
| User1 | A | 2022 Mar. 1 | 80 per month | 100 per month | DeviceA |

An "ID" column stores an identifier of a user who can use the print management server 102.

A "Service Plan" column stores usage mode information in use of the print management server 102.

A "Service Start Date" column stores a date when the user starts to use the print management server 102.

A "Number of Printable Sheets" column stores the number of printable sheets based on the usage mode information stored in the "Service Plan" column.

An "Upper Limit of Number of Printable Sheets" column stores an upper limit of the number of printable sheets based on the usage mode information stored in the "Service Plan" column.

For example, the data in Table 2 indicates that the user corresponding to the ID "User1" is present, the user signs up for Service Plan A, and Service Plan A enables the user to perform print processing on up to 100 sheets per month through the print management server 102. The data in Table 2 also indicates that the user has already performed the print processing on 20 sheets.

A "Device ID" column stores an identifier for unique identification of the image forming apparatus 103 used by the user corresponding to the ID in the "ID" column.

The communication unit 321 acquires the user information data from the user information storing unit 326, and determines whether print processing on the print data received in step S403 is possible. For example, in the case of the data in Table 1, one copy of print data of 10 pages is to be made, namely, printing is to be performed on 10 sheets. Since the value in the "Number of Printable Sheets" column in the user information data in Table 2 is 80, the communication unit 321 determines that the print processing is possible. In a case where the communication unit 321 determines that the print processing is not possible, the print request received in step S403 is deleted, the communication unit 311 returns a response indicating rejection of the print request to the communication unit 301, and the processing ends.

In step S405, the data reception unit 322 acquires the print data included in the print request received by the communication unit 321.

In step S406, the data reception unit 322 transmits the print data to the data conversion unit 323, and requests the data conversion unit 323 to perform data conversion processing.

In step S407, the data conversion unit 323 performs conversion processing to convert the format of the print data into a format printable by the image forming apparatus 103. The processing performed by the data conversion unit 323 at this time is similar to, for example, data conversion processing performed by the printer driver.

In step S408, the communication unit 311 receives the print data generated by the data conversion unit 323, from the communication unit 321 through the network 100.

In step S409, upon receiving the print data, the communication unit 311 instructs the corresponding function application 313 to perform print processing.

In step S410, the function application 313 performs the print processing.

In step S411, the communication unit 311 transmits, to the communication unit 321, the monitoring information including information about the consumables consumed in the print processing performed in step S410.

In step S412, upon receiving the monitoring information, the communication unit 321 instructs the monitoring information update unit 325 to update the monitoring information.

Table 3 illustrates an example of data of the monitoring information managed by the monitoring information storing unit 324.

TABLE 3

<Monitoring Information Data>

| Device ID | Toner Remaining Amount (Black) | Toner Remaining Amount (Yellow) | Toner Remaining Amount (Magenta) | Toner Remaining Amount (Cyan) | Number of Printed Sheets | Job Transmission Source |
|---|---|---|---|---|---|---|
| DeviceA | 80% | 70% | 85% | 40% | 10 | Print management server |

A "Device ID" column stores an identifier for unique identification of the image forming apparatus 103 connected to the print management server 102.

"Toner Remaining Amount" columns each store the remaining amount of toner installed in the image forming apparatus 103 corresponding to a value in the "Device ID" column. In Table 3, four "Toner Remaining Amount" columns for black, yellow, magenta, and cyan are illustrated. In the present exemplary embodiment, the monitoring information data includes information about the remaining amount of each toner in the image forming apparatus 103, but the monitoring information data can include information about any consumable. Further, the four colors of toner are merely examples, and the number of colors of toner is not specifically limited. The communication unit 311 transmits the monitoring information to the print management server 102 every time the print processing is completed.

A "Number of Printed Sheets" column stores the number of sheets printed in the print processing performed this time.

A "Job Transmission Source" column stores information for unique identification of an apparatus that has transmitted the print job to the image forming apparatus 103. Since the communication unit 311 receives the print job from the print management server 102 in step S408, the "Job Transmission Source" column stores information indicating the print management server 102 in this example.

In step S413, the user information storing unit 326 subtracts the value in the "Number of Printed Sheets" column of the monitoring information data, from the value in the "Number of Printable Sheets" column of the user information data, to update the value in the "Number of Printable Sheets" column.

Through the series of processing described above, the print processing through the print management server 102 is completed.

Figure 5:
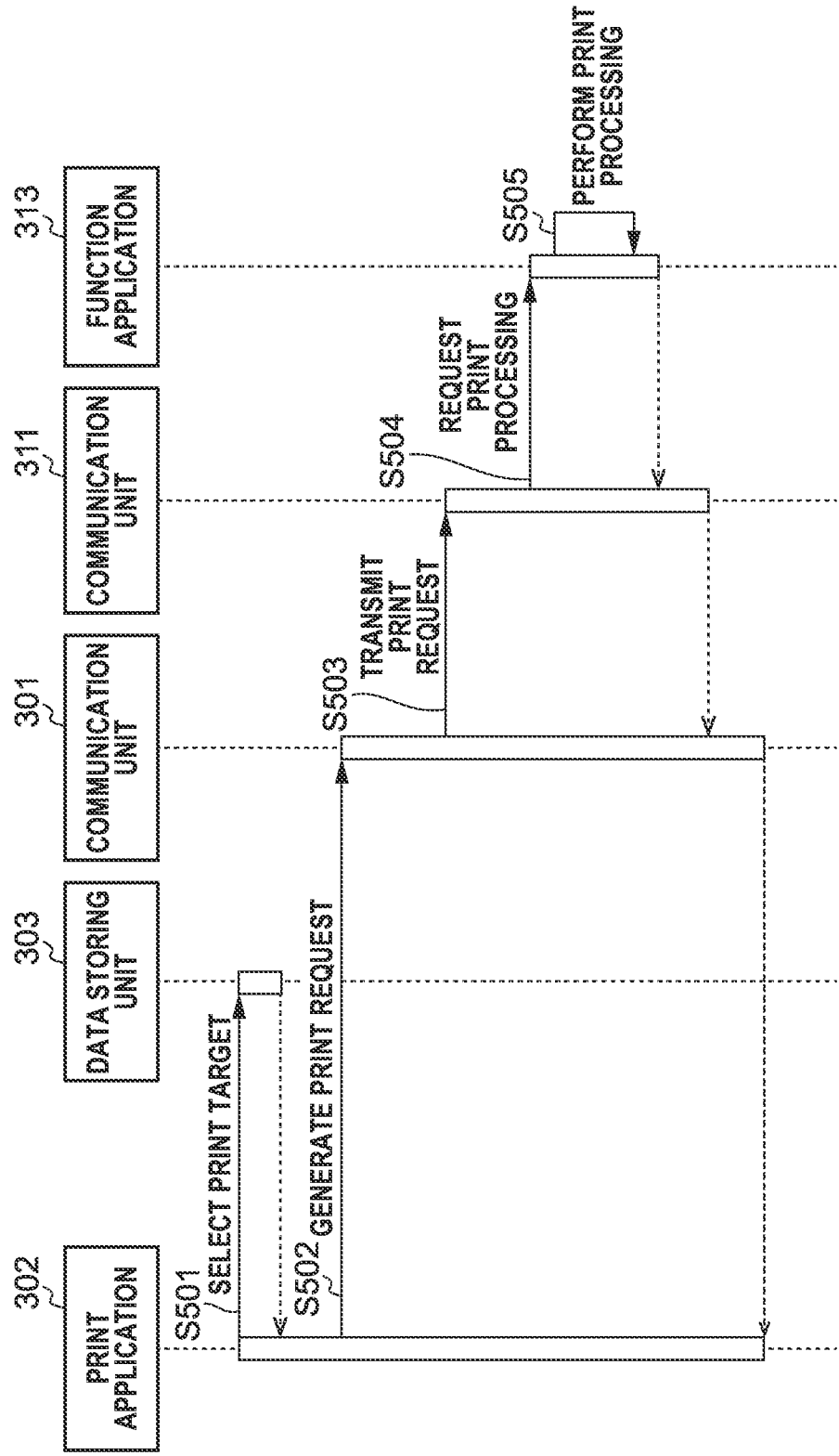
FIG. 5 is a sequence diagram illustrating private print processing without going through the print management server.

FIG. 5 is a sequence diagram illustrating a flow of a series of processing in a case where the PC 101 instructs the image forming apparatus 103 not connected to the print management server 102 to perform direct printing in the present exemplary embodiment. FIG. 5 illustrates an example in which a private print job is executed.

In step S501, the print application 302 acquires, from the data storing unit 303, the data to be printed. For the data to be printed, various formats including a document format and an image format are available, and the format of the data is not specifically limited in the present exemplary embodiment.

In step S502, the print application 302 converts the format of the data to be printed into a data format printable by the image forming apparatus 103, thereby generating a print job and a print request.

In step S503, the communication unit 301 transmits the print request to the communication unit 311.

In step S504, upon receiving the print request, the communication unit 311 instructs the corresponding function application 313 to perform print processing.

In step S505, the function application 313 performs the print processing.

Through the series of processing described above, the print processing by the image forming apparatus 103 not connected to the print management server 102 is completed.

Figure 6:
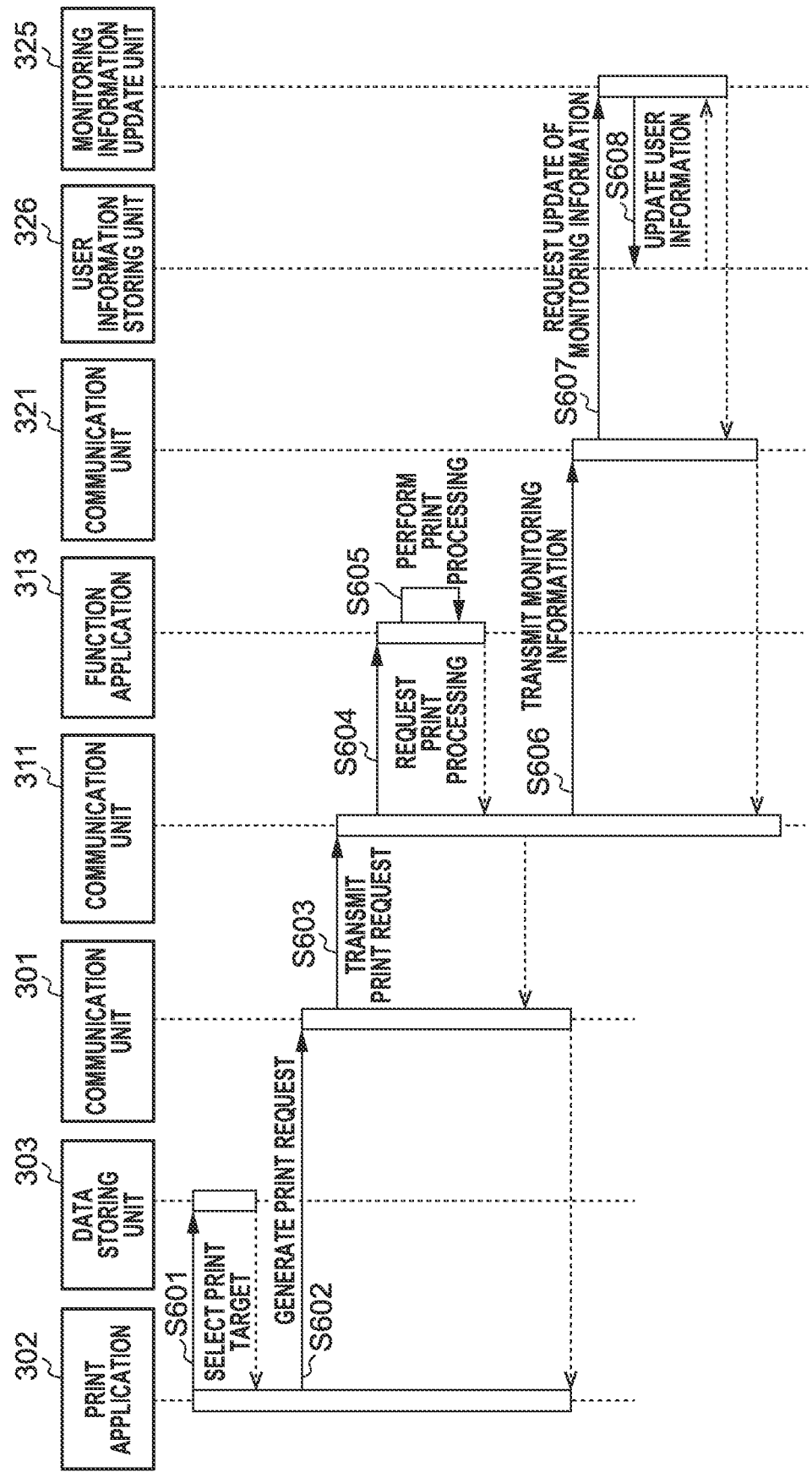
FIG. 6 is a sequence diagram illustrating transmission of monitoring information to the print management server during the private print processing.

FIG. 6 is a sequence diagram illustrating a flow of a series of processing in a case where the PC 101 instructs the image forming apparatus 103 connected to the print management server 102 to perform direct printing in the present exemplary embodiment.

In step S601, the print application 302 acquires, from the data storing unit 303, the data to be printed. For the data to be printed, various formats including a document format and an image format are available, and the format of the data is not specifically limited in the present exemplary embodiment.

In step S602, the print application 302 converts the format of the data to be printed into a data format printable by the image forming apparatus 103, thereby generating a print job and a print request.

In step S603, the communication unit 301 transmits the print request to the communication unit 311.

In step S604, upon receiving the print request, the communication unit 311 instructs the corresponding function application 313 to perform print processing.

In step S605, the function application 313 performs the print processing.

In step S606, the communication unit 311 transmits, to the communication unit 321, the monitoring information including information about the consumables consumed in the print processing performed in step S605.

In step S607, upon receiving the monitoring information, the communication unit 321 instructs the monitoring information update unit 325 to update the monitoring information.

In step S608, the user information storing unit 326 subtracts the value in the "Number of Printed Sheets" column of the monitoring information data, from the value in the "Number of Printable sheets" column of the user information data, to update the value in the "Number of Printable Sheets" column.

Through the series of processing described above, the print processing by the image forming apparatus 103 connected to the print management server 102 is completed. FIG. 6 is different from FIG. 5 in that the image forming apparatus 103 connected to the print management server 102 transmits the monitoring information data as an execution result of the print processing to the print management server 102.

Figure 7:
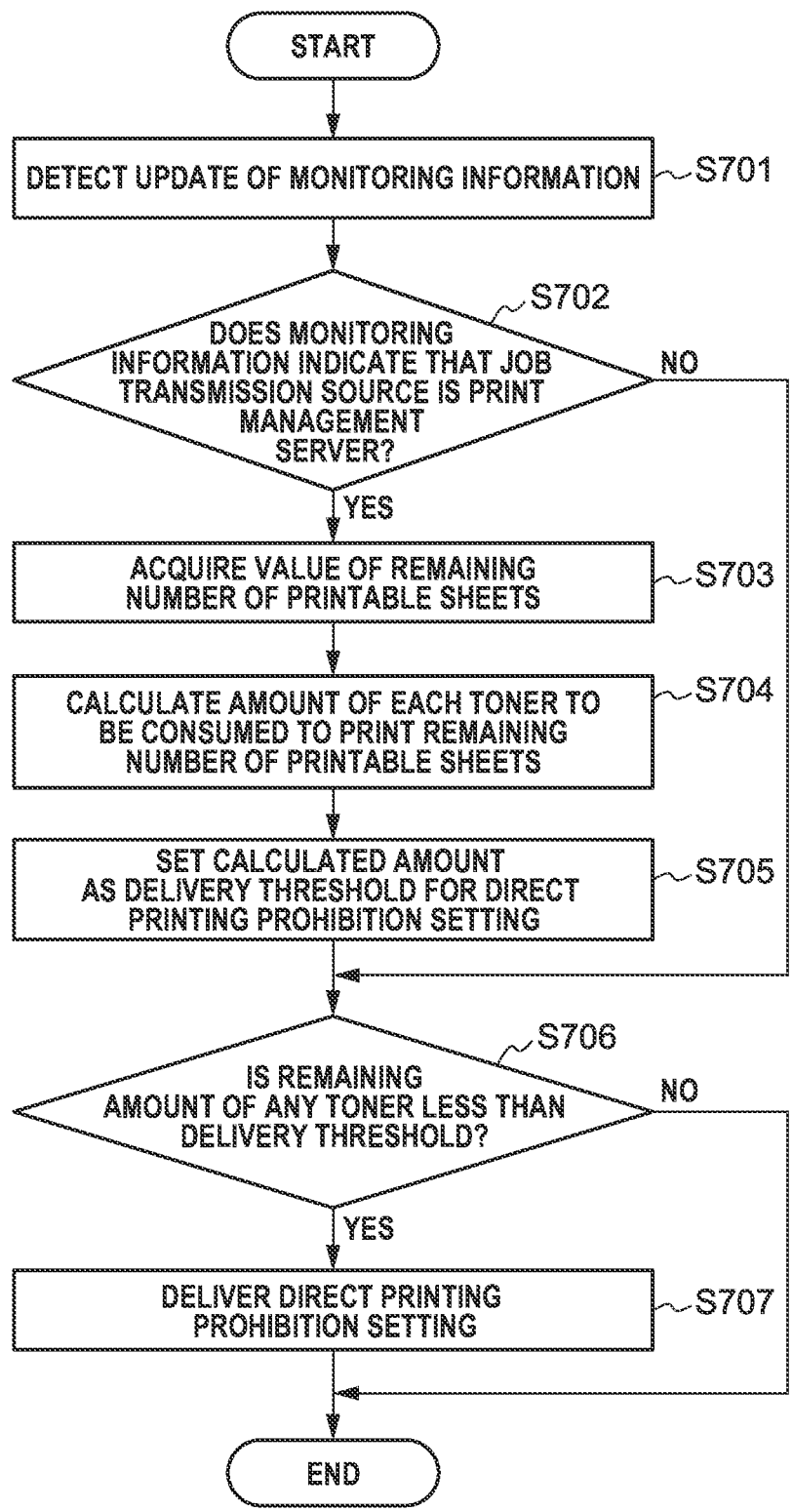
FIG. 7 is a flowchart illustrating processing for determining whether to deliver a direct printing prohibition setting.

FIG. 7 is a flowchart illustrating setting update determination processing performed when the print management server 102 receives the monitoring information from the image forming apparatus 103 that has completed the print processing. The processing is performed when the monitoring information stored in the monitoring information storing unit 324 is updated by the monitoring information update unit 325 in step S412 or step S607.

In step S701, the setting storing unit 327 detects update of the monitoring information.

In step S702, the setting storing unit 327 refers to the value in the "Job Transmission Source" column of the monitoring information data. In a case where the value in the "Job Transmission Source" column indicates the print management server 102 (YES in step S702), the processing proceeds to step S703. In a case where the value in the "Job Transmission Source" column indicates the PC 101 (NO in step S702), the processing proceeds to step S706.

In step S703, the setting storing unit 327 acquires the value in the "Number of Printable Sheets" column managed by the user information storing unit 326.

In step S704, the setting storing unit 327 calculates the amount of each toner to be consumed to print the user's remaining number of printable sheets acquired in step S703.

In step S705, the setting storing unit 327 sets the amount of each toner calculated in step S704, as a delivery threshold for a direct printing prohibition setting.

Table 4 illustrates an example of data on the delivery threshold for the direct printing prohibition setting managed by the setting storing unit 327. The direct printing prohibition setting is a device setting to prohibit reception of a print job without going through the print management server 102.

TABLE 4

| | <Delivery Threshold Data> | | | |
|---|---|---|---|---|
| Device ID | Toner Remaining Amount (Black) | Toner Remaining Amount (Yellow) | Toner Remaining Amount (Magenta) | Toner Remaining Amount (Cyan) |
| DeviceA | 20% | 20% | 20% | 20% |

A "Device ID" column stores an identifier for unique identification of the image forming apparatus 103 connected to the print management server 102.

"Toner Remaining Amount" columns each store a delivery threshold for the direct printing prohibition setting. When the remaining amount of toner of any color in the image forming apparatus 103 is less than the value in the corresponding column, delivery of the direct printing prohibition setting is determined. In Table 4, four "Toner Remaining Amount" columns for black, yellow, magenta, and cyan are illustrated.

In step S706, the setting storing unit 327 compares the delivery threshold data held by the setting storing unit 327 with the values in the "toner remaining amount" columns of the monitoring information data held by the monitoring information storing unit 324, and determines whether the remaining amount of any toner is less than the delivery threshold, as a predetermined condition.

In a case where the remaining amount of any toner is less than the delivery threshold (YES in step S706), the processing proceeds to step S707.

In step S707, the setting storing unit 327 generates direct printing prohibition setting data, and transmits the direct printing prohibition setting data to the communication unit 311.

Table 5 illustrates an example of the direct printing prohibition setting data generated by the setting storing unit 327.

TABLE 5

<Direct Printing Prohibition Setting Data>

| Device ID | Print Port | USB Port | LAN Port |
|---|---|---|---|
| DeviceA | OFF | OFF | OFF |

A "Device ID" column stores an identifier for unique identification of the image forming apparatus 103 connected to the print management server 102.

A "Print Port" column, a "USB Port" column, and a "LAN Port" column store setting values for the respective interfaces through which the image forming apparatus 103 receives a print job. Each of the columns stores a setting value for disabling the corresponding interface.

In the present exemplary embodiment, three types of interfaces are illustrated as examples. In a case where the image forming apparatus 103 includes another interface through which a print job is receivable, a column storing a setting value for the interface can be added.

When the communication unit 311 of the image forming apparatus 103 receives the direct printing prohibition setting data, the direct printing prohibition setting data is stored in the setting storing unit 314. The setting update unit 316 disables the setting of the devices corresponding to the respective interface columns of the direct printing prohibition setting data stored in the setting storing unit 314. This makes the image forming apparatus 103 unable to receive a print job from the PC 101, which prevents a situation where the print processing through the print management server 102 fails due to toner shortage of the image forming apparatus 103 caused by direct printing from the PC 101.

As described above, according to the present exemplary embodiment, in a case where the remaining amount of any consumable of the image forming apparatus 103 (the printing apparatus) is less than a threshold, the print management server 102 delivers, to the image forming apparatus 103 (the printing apparatus), a device setting to prohibit reception of a print job without going through the print management server 102. As a result, print processing through the print management server 102 is preferentially performed.

The above-described processing according to the first exemplary embodiment enables the image forming apparatus 103 to reliably perform the print processing through the print management server 102. However, depending on the situation, the user may wish to transmit a direct printing job from the PC 101 to the image forming apparatus 103 even if the user is aware that the print processing through the print management server 102 can fail due to shortage of consumables.

In a second exemplary embodiment, a method will be described in which the direct printing prohibition setting that has already been reflected in the image forming apparatus 103 is canceled based on the user's intention.

Figure 8:
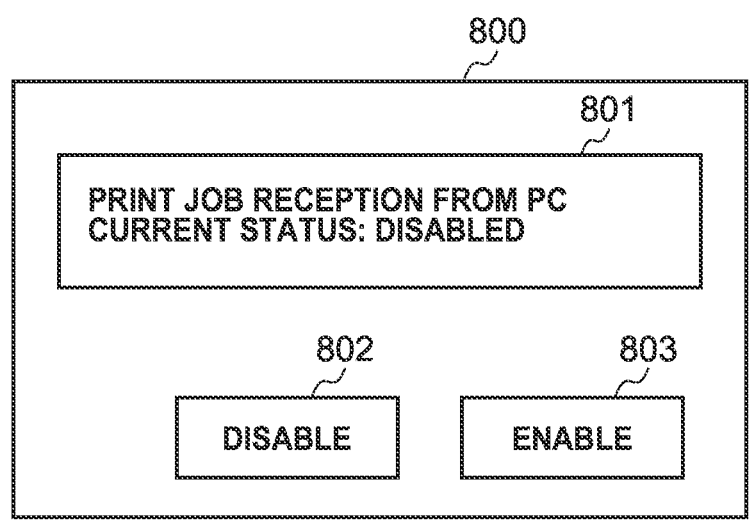
FIG. 8 is a diagram illustrating an example of a display screen for requesting delivery of a direct printing permission setting according to a second exemplary embodiment.

FIG. 8 is a diagram illustrating an example of a print setting change screen 800 displayed on the operation unit 231 of the image forming apparatus 103.

The print setting change screen 800 includes a status information label 801, a direct printing permission setting disable button 802, and a direct printing permission setting enable button 803 (hereinafter simply referred to a button 802 and a button 803).

The status information label 801 displays the status of a print setting currently set in the image forming apparatus 103.

Based on the current status of the print setting stored in the setting storing unit 314 of the image forming apparatus 103, one of the buttons 802 and 803 is in a pressable state.

For example, in a case where the direct printing prohibition setting is set, text indicating that the setting of print job reception from the PC is disabled is displayed in the status information label 801, and only the button 803 is in the pressable state. In a case where the direct printing prohibition setting is not set, only the button 802 is in the pressable state.

Figure 9:
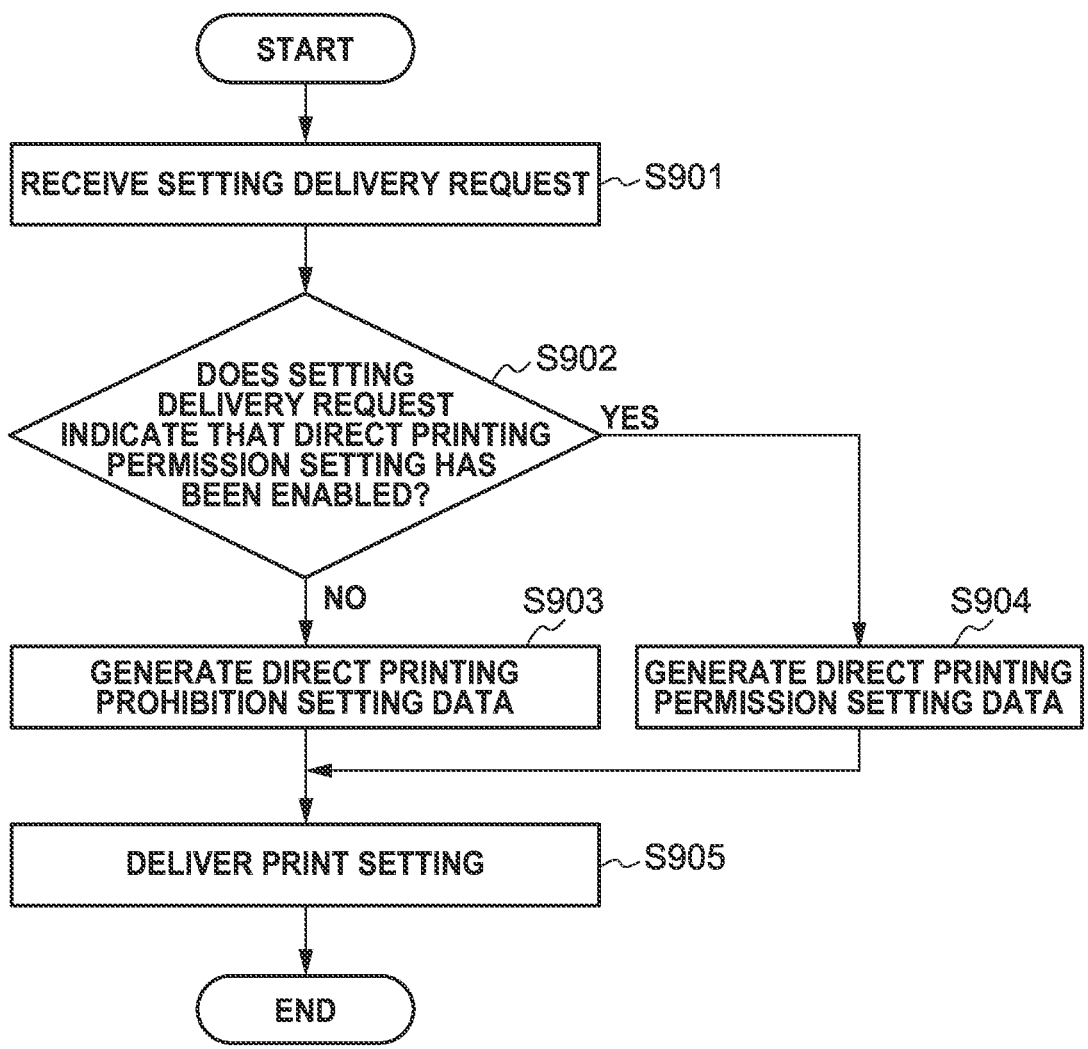
FIG. 9 is a flowchart illustrating processing for determining whether to deliver the direct printing permission setting according to the second exemplary embodiment.

FIG. 9 is a flowchart illustrating a series of processing when a print setting is received from the print management server 102 through the print setting change screen 800.

In step S901, when the button 802 or 803 is pressed, the communication unit 311 transmits a setting delivery request to the communication unit 321.

In step S902, the communication unit 321 determines whether the setting delivery request indicates that a direct printing permission setting has been enabled. In a case where the button 802 has been pressed to disable the direct printing permission setting (NO in step S902), the processing proceeds to step S903. In a case where the button 803 is pressed to enable the direct printing permission setting (YES in step S902), the processing proceeds to step S904.

In step S903, the setting storing unit 327 generates direct printing prohibition setting data.

In step S904, the setting storing unit 327 generates direct printing permission setting data.

In step S905, the communication unit 321 delivers the print setting to the communication unit 311.

The series of processing described above makes it possible to, even in a case where the print management server 102 delivers the setting to prohibit print job reception from the PC 101 to the image forming apparatus 103 once, to cancel the setting based on the user's intention.

In the second exemplary embodiment, the method has been described in which the setting to prohibit print job reception from the PC 101 is canceled based on the user's intention even after the print management server 102 delivers the setting to the image forming apparatus 103 once.

In this case, however, the user can freely cancel the setting that is based on the determination by the print management server 102 that direct printing should be prohibited. If the consumables have run out due to direct printing, it is difficult to perform print processing through the print management server 102 in a case where the print processing is really necessary.

In a third exemplary embodiment, a method will be described in which, in a case where the direct printing prohibition setting is canceled, the print management server 102 accepts a request to cancel the direct printing prohibition setting from the user only when the print management server 102 confirms that print processing through the print management server 102 is not inhibited.

Figure 10:
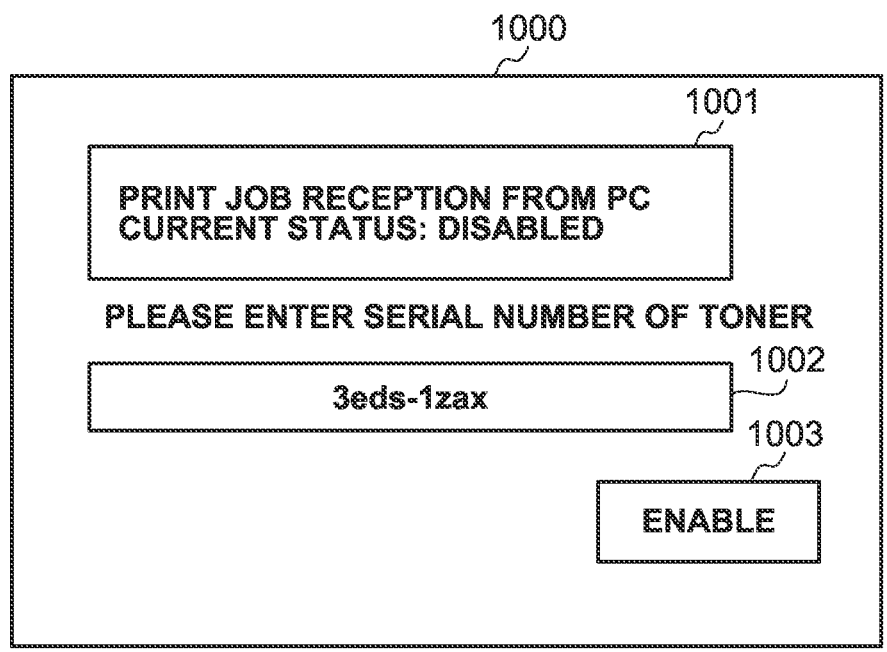
FIG. 10 is a diagram illustrating an example of a display screen for requesting delivery of a direct printing permission setting according to a third exemplary embodiment.

FIG. 10 is a diagram illustrating an example of a print setting change screen 1000 displayed on the operation unit 231 of the image forming apparatus 103.

The print setting change screen 1000 includes a status information label 1001, a serial number entry field 1002, and a direct printing permission setting enable button 1003.

The status information label 1001 displays the status of a print setting currently set in the image forming apparatus 103.

The serial number entry field 1002 is a text field where a serial number of the consumables installed in the image forming apparatus 103 can be entered.

When the direct printing permission setting enable button 1003 is pressed, the communication unit 311 transmits a request to deliver the direct printing permission setting to the print management server 102.

In other words, in a case where a direct printing job is received from the PC 101 and the consumables of the image forming apparatus 103 are consumed by direct printing, the print management server 102 enables the delivery of the direct printing permission setting only when the print management server 102 confirms that the user keeps replacement consumables close at hand.

Figure 11:
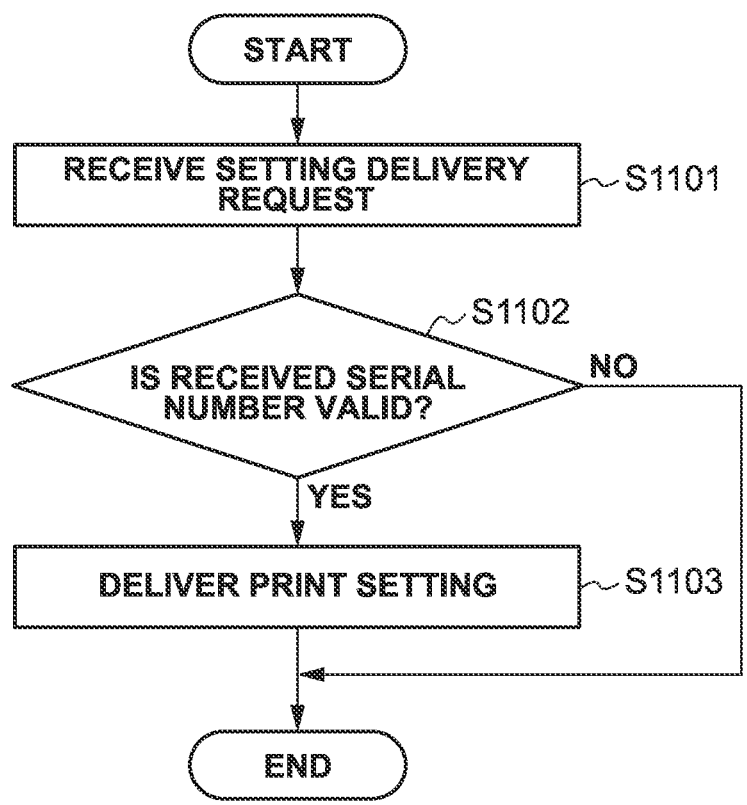
FIG. 11 is a flowchart illustrating processing for determining whether to deliver the direct printing permission setting according to the third exemplary embodiment.

FIG. 11 is a flowchart illustrating a series of processing when print setting data is received from the print management server 102 through the print setting change screen 1000.

In step S1101, when the direct printing permission setting enable button 1003 is pressed, the communication unit 311 transmits, to the communication unit 321, a setting delivery request including the serial number entered in the serial number entry field 1002.

In step S1102, the setting storing unit 327 determines whether the serial number included in the received request is the serial number of the consumables of the image forming apparatus 103.

In a case where the setting storing unit 327 determines that the serial number in the received request is the serial number of the consumables of the image forming apparatus 103 (YES in step S1102), then in step S1103, the communication unit 321 delivers the direct printing permission setting to the communication unit 311.

The series of processing described above makes it possible to deliver the direct printing permission setting to the image forming apparatus 103 only in a case where the print management server 102 confirms that the user keeps replacement consumables close at hand.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-072954, filed on Apr. 27, 2022, which is hereby incorporated by reference herein in its entirety.

What is claimed is:

1. A printing system comprising:
a printing apparatus; and
a server configured to manage information about the printing apparatus,
wherein the printing apparatus transmits, to the server, monitoring information indicating a usage state of the printing apparatus,
wherein the server receives the monitoring information from the printing apparatus,
wherein, in a case where the server determines that the usage state of the printing apparatus satisfies a predetermined condition based on the received monitoring information, the server delivers, to the printing apparatus, a device setting to prohibit reception of a print job without going through the server, and
wherein, in a case where the printing apparatus receives the delivered device setting, the printing apparatus prohibits the reception of the print job without going through the server.

2. The printing system according to claim 1, wherein the monitoring information indicating the usage state of the printing apparatus includes information about a remaining amount of a consumable of the printing apparatus.

3. The printing system according to claim 1,
wherein the printing apparatus receives a first print job from an information processing apparatus through the server,
wherein the printing apparatus receives a second print job from the information processing apparatus without going through the server, and
wherein, in a case where the printing apparatus receives the first print job through the server, the printing apparatus transmits the monitoring information.

4. The printing system according to claim 3,
wherein the first print job is a business print job, and
wherein the second print job is a private print job.

5. A printing apparatus communicable with a server, the printing apparatus comprising:
a memory that stores instructions; and
a processor that executes the instructions to:
transmit, to the server, monitoring information indicating a usage state of the printing apparatus;
receive, from the server, a device setting to prohibit reception of a print job without going through the server, the device setting being transmitted from the server to the printing apparatus in a case where the server determines that the usage state of the printing apparatus satisfies a predetermined condition based on the monitoring information; and perform a setting to prohibit the reception of the print job without going through the server based on the received device setting.

6. The printing apparatus according to claim 5, wherein the monitoring information indicating the usage state of the printing apparatus includes information about a remaining amount of a consumable of the printing apparatus.

7. The printing apparatus according to claim 5,
wherein the printing apparatus receives a first print job from an information processing apparatus through the server, and
wherein the printing apparatus receives a second print job from the information processing apparatus without going through the server.

8. The printing apparatus according to claim 7,
wherein the first print job is a business print job, and
wherein the second print job is a private print job.

9. A server configured to manage information about a printing apparatus, the server comprising:
a memory that stores instructions; and
a processor that executes the instructions to:
receive, from the printing apparatus, monitoring information indicating a usage state of the printing apparatus; and
deliver a device setting to the printing apparatus, in a case where the usage state of the printing apparatus is determined to satisfy a predetermined condition based on the received monitoring information, to prohibit reception of a print job without going through the server,
wherein, in a case where the printing apparatus receives the delivered device setting, the printing apparatus prohibits the reception of the print job without going through the server.

10. A method for controlling a printing apparatus communicable with a server, the method comprising:
transmitting, to the server, monitoring information indicating a usage state of the printing apparatus;
receiving, from the server, a device setting to prohibit reception of a print job without going through the server, the device setting being transmitted from the server to the printing apparatus in a case where the server determines that the usage state of the printing apparatus satisfies a predetermined condition based on the monitoring information; and
performing a setting to prohibit the reception of the print job without going through the server based on the received device setting.

11. A non-transitory computer-readable storage medium that stores a program, wherein the program causes a processor of a printing apparatus to:
transmit, to a server, monitoring information indicating a usage state of the printing apparatus;
receive, from the server, a device setting to prohibit reception of a print job without going through the server, the device setting being transmitted from the server to the printing apparatus in a case where the server determines that the usage state of the printing apparatus satisfies a predetermined condition based on the monitoring information; and
perform a setting to prohibit the reception of the print job without going through the server based on the received device setting.

12. A method for controlling a server configured to manage information about a printing apparatus, the method comprising:
receiving, from the printing apparatus, monitoring information indicating a usage state of the printing apparatus; and
delivering a device setting to the printing apparatus, in a case where the usage state of the printing apparatus is determined to satisfy a predetermined condition based on the received monitoring information, to prohibit reception of a print job without going through the server,
wherein, in a case where the printing apparatus receives the delivered device setting, the printing apparatus prohibits the reception of the print job without going through the server.

13. A non-transitory computer-readable storage medium that stores a program, wherein the program causes a processor of a server to:
receive, from a printing apparatus, monitoring information indicating a usage state of the printing apparatus; and
deliver a device setting to the printing apparatus, in a case where the usage state of the printing apparatus is determined to satisfy a predetermined condition based on the received monitoring information, to prohibit reception of a print job without going through the server,
wherein, in a case where the printing apparatus receives the delivered device setting, the printing apparatus prohibits the reception of the print job without going through the server.

* * * * *